US009940273B2

(12) United States Patent
Qiu et al.

(10) Patent No.: US 9,940,273 B2
(45) Date of Patent: Apr. 10, 2018

(54) DYNAMIC RAM SHARING IN SOFTWARE-DEFINED TDD COMMUNICATION

(71) Applicant: Texas Instruments Incorporated, Dallas, TX (US)

(72) Inventors: Wenxun Qiu, Allen, TX (US); Minghua Fu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 291 days.

(21) Appl. No.: 14/702,996

(22) Filed: May 4, 2015

(65) Prior Publication Data

US 2016/0139853 A1 May 19, 2016

Related U.S. Application Data

(60) Provisional application No. 62/082,009, filed on Nov. 19, 2014.

(51) Int. Cl.

*G06F 12/00* (2006.01)
*G06F 13/28* (2006.01)
*G06F 9/50* (2006.01)
*G06F 13/10* (2006.01)

(52) U.S. Cl.

CPC ................ *G06F 13/28* (2013.01); *G06F 9/50* (2013.01); *G06F 13/102* (2013.01)

(58) Field of Classification Search

CPC ........... G06F 13/28; G06F 9/50; G06F 13/102
See application file for complete search history.

(56) References Cited

U.S. PATENT DOCUMENTS

| | | | | |
|---|---|---|---|---|
| 5,313,582 | A * | 5/1994 | Hendel | G06F 5/06 710/56 |
| 6,768,901 | B1 | 7/2004 | Osborn et al. | |
| 7,424,556 | B1 | 9/2008 | Spitzer et al. | |
| 2005/0251725 | A1 | 11/2005 | Huang et al. | |
| 2007/0271572 | A1 | 11/2007 | Gupta et al. | |
| 2013/0201965 | A1 | 8/2013 | Schmidl et al. | |

FOREIGN PATENT DOCUMENTS

| | | |
|---|---|---|
| EP | 2584709 | 4/2013 |

OTHER PUBLICATIONS

"C dynamic memory allocation" from Wikipedia, the free encyclopedia, pp. 1-9.

* cited by examiner

*Primary Examiner* — Larry T Mackall
(74) *Attorney, Agent, or Firm* — Lawrence J. Bassuk; Charles A. Brill; Frank D. Cimino

(57) ABSTRACT

Dynamic sharing of RAM in a software-defined communication system includes storing program code in a flash memory, categorizing parts of the code into groups of transmit categories according to when a part of the code needs to be copied into a section of a RAM and then executed during a first state of a TX state machine and according to how another part of the code can be later fit into the same section and then executed during a second state. Similarly, parts of the code are categorized into groups of receive categories according to when a part of the code needs to be copied into a section of RAM and then executed during a first state of a RX state machine and according to how another part of the code can be later fit into that section and then executed during a second state of the RX state machine, to reduce the amount of RAM without sacrificing speed performance.

20 Claims, 7 Drawing Sheets

DYNAMIC RAM SHARING IN SOFTWARE-DEFINED TDD COMMUNICATION

CROSS REFERENCE TO RELATED APPLICATION

This application claims the benefit of U.S. provisional application Ser. No. 62/082,009 filed Nov. 19, 2014 entitled “Method of Dynamic RAM Sharing in TDD Software Define Communication System”, by Wenxun Qiu and Minghua Fu, and entirely incorporated herein by reference.

BACKGROUND OF THE INVENTION

The present invention relates generally to software-defined or software-programmable TDD (time division duplex) communication systems. The invention relates more particularly to a technique and structure for dynamically sharing RAM (random access memory) by categorizing program code and/or data code copied from a flash memory according to when each category of the program code is to be copied from the flash memory into the RAM and also according to how available RAM space is to be shared with other categories of code copied from the flash memory. The term TDD (time division duplex) refers to communication systems in which the forward direction (i.e., transmission) communication links are separated in time from reverse direction (i.e., receive) communication links by allocating different time slots for transmission links and receiving links in the same frequency band. A software-defined communication system is one wherein components and functions are implemented by means of software in a programmable device such as a DSP (digital signal processor) or a FPGA (field programmable gate array). A software-defined communication system may be either a wireless communication system such as a SDR (software-defined radio) system or a wired communication system such as a software-defined power line communication system.

FIG. 1 shows a basic software-defined communication system that includes a DSP 2 coupled by a bidirectional digital bus 3 to analog-to-digital and digital-to-analog conversion circuitry 4. Conversion circuitry 4 is coupled by a bidirectional digital bus 5 to conventional RF front end circuitry 6 which also is connected to an RF antenna 7. Substantial amounts of signal processing often are handed over to a general-purpose processor (not shown) rather than being performed in special-purpose hardware. The purpose of the basic software-defined communication system typically is to generate both transmitter baseband signals and to process received baseband signals by means of the DSP 2. A software-defined implementation provides a high degree of flexibility in configuring and modifying a communication system. Widely different radio protocols, which sometimes are referred to as “waveforms”, can be fit into a single platform (e.g., a particular set of integrated circuit chips) by utilizing different software in the platform.

A software-defined communication system typically includes different kinds of memories, including RAM (random access memory), flash memory, and ROM (read only memory). RAM is the most expensive kind of memory and has the fastest writing and reading access speeds. Flash memory is less expensive, but has much slower access speeds. ROM is the least expensive kind of memory and has fast read access speeds comparable to those of RAM, but new data cannot be written into a ROM. Constant value code and program code can be stored in a flash memory and can be directly accessed from the RAM by a DSP or other processor, but this technique reduces the amount of expensive RAM that is required. Alternatively, constant value code and program code can be initially stored in the flash memory, then copied into the RAM, and then accessed directly by the DSP or other processor. This technique provides higher operating speed but is more costly because a larger amount of expensive RAM is required.

Note that the terminology “MIPS” means 1 million instructions per second, and is used to indicate the computational speed requirement for a particular part of program code and the computational power of a suitable DSP. In order to reduce the cost of a software-defined communication system, it is common practice to select a DSP that just fits the application without allowing very much “headroom” for computational capability. In conventional dynamic sharing of RAM (e.g., as explained in the cited Wikipedia reference at the website http://en.wikipedia.org/wiki/C_dynamic_memory_allocation), the programming code and constant value code are all copied from flash memory into RAM before the programming code and constant value code are executed.

In a software-defined TDD communication system, the TX state machine 13 and the RX state machine never run simultaneously. A data memory section shares various categories of RAM among different states of a state machine, but the program code does not “overlap” in the RAM in the sense that particular sections of RAM are used to store different sections of program code for different successive states of the state machine, due to the “overhead” of dynamic RAM sharing for the program code section. To achieve dynamic RAM sharing, the program section needs to be copied from flash memory to RAM before executing the code of the program section. Such copying requires a substantial additional amount of time. In the prior art the program code is all copied at once prior to executing any of it. However, ordinarily some of the program code needs to be executed at very high speed, i.e. at a very high MIPS rate. This does not allow the program code to be copied all at one time from the flash memory into the RAM. Consequently, present software-defined TDD communication systems do not use dynamic RAM sharing techniques. Instead, static RAM allocation is used.

It should be appreciated that operation of a software-defined TDD communication system is very “timing-intensive”. This makes it necessary to execute the program associated with the state machine 10 of FIG. 2 in RAM because RAM read and write operations both are much faster than those of any flash memory. As mentioned earlier, it has been necessary to copy the software program from flash into RAM in prior software-defined TDD communication systems in the state-by-state operation of a complex state machine (for example a state machine of the kind shown in subsequently described FIG. 2). This is because the amount of time that would be needed for the large number of required flash memory accessing operations would be prohibitive. Consequently, the prior art systems require all of the program code to be copied from the flash memory to the RAM at the very beginning of system operation and this has required use of a large amount of costly RAM. Unfortunately, the use of conventional dynamic sharing of RAM in a software-defined communication system is unacceptably expensive due to the relatively high cost of RAM compared to flash memory.

Use of multiple modulation equipment including multiple types of modulation in wireless networks is disclosed in commonly assigned Patent Application Publication No. US 2013/0201965, entitled "Wireless Networks Utilizing Multiple Modulations" published Aug. 8, 2013, by Schmidl et al.

Thus, there is an unmet need for a software-defined TDD or FDD (frequency division duplex) communication system and method which is less expensive than the prior art.

There also is an unmet need for a software-defined TDD or FDD communication system and method which is less expensive than the prior art without substantially sacrificing speed performance.

There also is an unmet need for a software-defined multi-modulation TDD or FDD communication system and method which is less expensive than the prior art without substantially sacrificing speed performance.

There also is an unmet need for a software-defined multi-modulation TDD or FDD communication system and method which requires substantially less RAM than the prior art, without substantially sacrificing speed performance.

There also is an unmet need for an improved and cost-effective way of achieving dynamic RAM sharing allocation in a software-defined TDD or FDD communication system without substantially sacrificing speed performance.

SUMMARY OF THE INVENTION

It is an object of the invention to provide a software-defined TDD or FDD communication system and method which is less expensive than the prior art.

It is another object of the invention to provide a software-defined TDD or FDD communication system and method which is less expensive than the prior art without substantially sacrificing speed performance.

It is another object of the invention to provide a software-defined multi-modulation TDD or FDD communication system and method which is less expensive than the prior art without substantially sacrificing speed performance.

It is another object of the invention to provide a software-defined multi-modulation TDD or FDD communication system and method which requires substantially less RAM than the prior art, without substantially sacrificing speed performance.

It is another object of the invention to provide a software-defined TDD or FDD communication system in which dynamic RAM sharing allocation is accomplished by utilizing a state machine in which some states require a lower MIPS rate, which allows some particular program code to be copied from flash memory into RAM during those states.

Briefly described, and in accordance with one embodiment, the present invention provides dynamic sharing of RAM in a software-defined communication system including storing program code in a flash memory (71), categorizing parts of the code into groups of transmit categories according to when a part of the code needs to be copied into a section of a RAM (75) and then executed during a first state of a TX state machine (13) and according to how another part of the code can be later fit into the same section and then executed during a second state. Similarly, parts of the code are categorized into groups of receive categories according to when a part of the code needs to be copied into a section of RAM and then executed during a first state of a RX state machine (11) and according to how another part of the code can be later fit into that section and then executed during a second state of the RX state machine, to reduce the amount of RAM without sacrificing speed performance.

In one embodiment, the invention provides a method of dynamic sharing of RAM (random access memory) in a software-defined communication system (53), including storing program code in a flash memory (71) of the software-defined communication system (53); categorizing a plurality of parts of the program code into a group of transmission categories (e.g., CAT1, 2, 3) according to when program code of each of a first group (e.g., CAT1) of the parts of the program code needs to be copied into a first part of a RAM (75) and then executed during a first state of a transmission (TX) state machine (13), and also according to how each of a second group (e.g., CAT4) of parts of the program code can be later fit into the first part of the RAM (75) and then executed during another state which may be another state of the TX state machine (13) or a state of a RX state machine (11), and also categorizing a plurality of parts of the program code into a group of receive categories (e.g., CAT4, 5, 6) according to when program code of each of a third group (e.g., CAT6) of the parts of the program code needs to be copied into a second part of the RAM (75) and then executed during a first state of the RX state machine (11) and also according to how each of a fourth group (e.g., CAT2) of parts of the program code can be later fit into the second part of the RAM (75) and then executed during another state which may be another state of the RX state machine (11) or another state of the TX state machine (13); copying the code of at least one category in the group of transmission categories from the flash memory (71) into the RAM (75) in accordance with the categorizing, copying the code of at least one category in the group of receive categories from the flash memory (71) into the RAM (75) in accordance with the categorizing; executing the TX state machine (13) during a transmission time interval to perform first predetermined operations on program code then in the RAM (75) to prepare transmission data to be transmitted; and executing the RX state machine (11) during a receive time interval to perform second predetermined operations on program code then in the RAM (75) to process data received. The foregoing steps are repeated for additional program code.

In one embodiment the method includes generating a first category (Cat0) that includes program codes and constant value codes which are frequently used in multiple states or cannot be copied in other states due to processor operating speed limitations and storing the first category (Cat0) in a portion of the RAM (75) which is not dynamically shared.

In one embodiment program code copied from flash memory into the RAM (75) to be dynamically shared is later overwritten only after that program code is no longer needed for execution of a particular state of a state machine.

In one embodiment the software-defined communication system is a time division duplex (TDD) system and in another embodiment the software-defined communication system is a frequency division duplex (FDD) system.

In one embodiment the method includes performing the dynamic sharing of RAM primarily for machine states which have lower requirements for a rate (MIPS) at which instructions are required to be executed by software of the software-defined communication system (53).

In one embodiment the method includes storing constant value code in the flash memory (71) and dynamically sharing the constant value code in the RAM (75).

In one embodiment the method includes operating a RAM sharing manager module (73) which executes an initialization function and executes the function of copying program code from flash memory into the RAM (75).

In one embodiment the RX state machine (11) includes a preamble detection state (17) for detecting the beginning of a synchronization header (SHR RX) received from the TX state machine (13).

In one embodiment the synchronization header (SHR RX) may be either of two kinds each having a different kind of modulation information and wherein the preamble detection state (17A in FIG. 7) performs two preamble detection operations in parallel to detect which kind of synchronization header (SHR RX) is present.

In one embodiment, multiple executions of one of the states are performed, and the method includes distributing code of a category copied to the RAM into the multiple executions of that state.

In one embodiment the invention provides a software-defined communication system (53) including a flash memory (71) storing program code of the software-defined communication system (53); a RAM (75) for receiving from the flash memory (71) a plurality of parts of the program code categorized into a group of transmission categories (e.g., CAT 1, 2, 3) according to when program code of each of a first group (e.g., CAT1) of the parts of the program code needs to be copied into a first part of the RAM (75) and then executed during a first state of a transmission (TX) state machine (13), the RAM (75) operating to receive from the flash memory (71) the parts of the program code according to how each of a second group of parts of the program code can be later fit into the first part of the RAM (75) and then executed during another state of the TX state machine (13) or a state of a RX state machine (11), the RAM (75) also receiving from the flash memory (71) a plurality of parts of the program code categorized into a group of receive categories (e.g., CAT4, 5, 6) according to when program code of each of a third group (e.g., CAT6) of the parts of the program code needs to be copied into a second part of the RAM (75) and then executed during a first state of the RX state machine (11), the RAM (75) operating to receive from the flash memory (71) the parts of the program code in the receive categories according to how each of a fourth group (e.g., CAT2) of parts of the program code can be later fit into the second part of the RAM (75) and then executed during another state which may be another state of the RX state machine (11) or another state of the TX state machine (13); the software-defined communication system (53) including circuitry (2) for copying the program code of at least one category in the group of transmission categories from the flash memory (71) into the RAM (75) in accordance with the categorization of the transmission categories, the software-defined communication system (53) also including circuitry (2) for copying the program code of at least one category in the group of receive categories from the flash memory (71) into the RAM (75) in accordance with the categorization of the receive categories; the TX (transmission) state machine (13) executing first predetermined operations on program code then in the RAM (75) during a transmission time interval to prepare transmission data to be transmitted to the RX state machine (11); and the RX state machine (11) executing second predetermined operations on program code then in the RAM (75) during a receive time interval to process data received from the TX state machine (13). In one embodiment the software-defined communication system is a time division duplex (TDD) system, and in another embodiment the software-defined communication system is a frequency division duplex (FDD) system.

In one embodiment the program code of the system includes a first category (Cat0) that includes program codes and constant value codes which are frequently used in multiple states or cannot be copied in other states due to processor operating speed limitations and wherein first category (Cat0) is stored in a portion of the RAM (75) which is not dynamically shared. The system program code preferably is categorized into the groups of transmission categories and receive categories such that the dynamic sharing of RAM occurs primarily for states which have lower requirements for a rate (MIPS) at which instructions are required to be executed by software of the software-defined communication system (53).

In one embodiment, the software-defined communication system (53) includes a RAM sharing manager module (73) which executes an initialization function and copying of program code from flash memory into the RAM (75), wherein the RX state machine (11) includes a preamble detection state (17) for detecting the beginning of a synchronization header (SHR RX) received from the TX state machine (13). The synchronization header (SHR RX) may be either of two kinds each having a different kind of modulation information and wherein the preamble detection state (17A in FIG. 7) performs two preamble detection operations in parallel to detect which kind of synchronization header (SHR RX) is present.

In one embodiment, multiple executions of one of the states are performed, wherein the system operates to distribute code of a category copied to the RAM into the multiple executions of that state.

In one embodiment, the invention provides a system for dynamic sharing of RAM (random access memory) in a software-defined communication system (53), including means (2, 70) for storing program code in a flash memory of the software-defined communication system (53); means (70, 80) for categorizing a plurality of parts of the program code into a group of transmission categories (e.g., CAT1, 2, 3) according to when program code of each of a first group (e.g., CAT1) of the parts of the program code needs to be copied into a first part of a RAM (75) and then executed during a first state of a transmission (TX) state machine (13), and also according to how each of a second group (e.g., CAT4) of parts of the program code can be later fit into the first part of the RAM (75) and then executed during another state which may be another state of the TX state machine (13) or a state of a RX state machine (11), and means (70, 80) for categorizing a plurality of parts of the program code into a group of receive categories (e.g., CAT4, 5, 6) according to when program code of each of a third group (e.g., CAT6) of the parts of the program code needs to be copied into a second part of the RAM (75) and then executed during a first state of the RX state machine (11) and also according to how each of a fourth group (e.g., CAT2) of parts of the program code can be later fit into the second part of the RAM (75) and then executed during another state which may be another state of the RX state machine (11) or another state of the TX state machine (13); means (2, 70) for copying the code of at least one category in the group of transmission categories from the flash memory (71) into the RAM (75) in accordance with the categorizing of step (b), means (2, 70) for copying the code of at least one category in the group of receive categories from the flash memory (71) into the RAM (75) in accordance with the categorizing); means (2) for executing the TX state machine (13) during a transmission time interval to perform first predetermined operations on program code then in the RAM (75) to prepare transmission data to be transmitted to the RX state machine (11); and means (2) for executing a RX (receive) state machine (11) during a receive time interval to perform second predetermined operations on program code then in the RAM (75) to process data received from the TX state machine (11).

DETAILED DESCRIPTION OF THE PREFERRED EMBODIMENTS

The present invention provides a method and structure for dynamic sharing of RAM among different state machine states of a software-defined TDD communication system. The term "Sharing" of RAM as used herein means that some, but not all, of the physical RAM addresses are reserved for the purpose of being used by certain categories of program code and constant value code which have been previously determined (1) in accordance with the times at which the program code of certain designated categories is to be copied from flash memory into RAM, and (2) in accordance with amounts of physical RAM that are available at the particular times, respectively. The various categories are utilized during corresponding specific states, respectively, of the state machine to store program code and/or constant code variables for executing the corresponding specific states. The program code includes the instructions to be executed, and the constant code variable data typically includes such things as look-up tables, filter coefficients, etc.

The present invention focuses on sharing of dynamic for the program code, and is based on characteristics of the state machine, especially on the fact that each state of the state machine is completely executed before the state machine moves on to its next state.

Dynamic RAM sharing allocation is accomplished by utilizing a state machine in which some states require a lower MIPS rate, which allows some particular program code to be copied from flash memory into RAM in those states.

Figure 2:
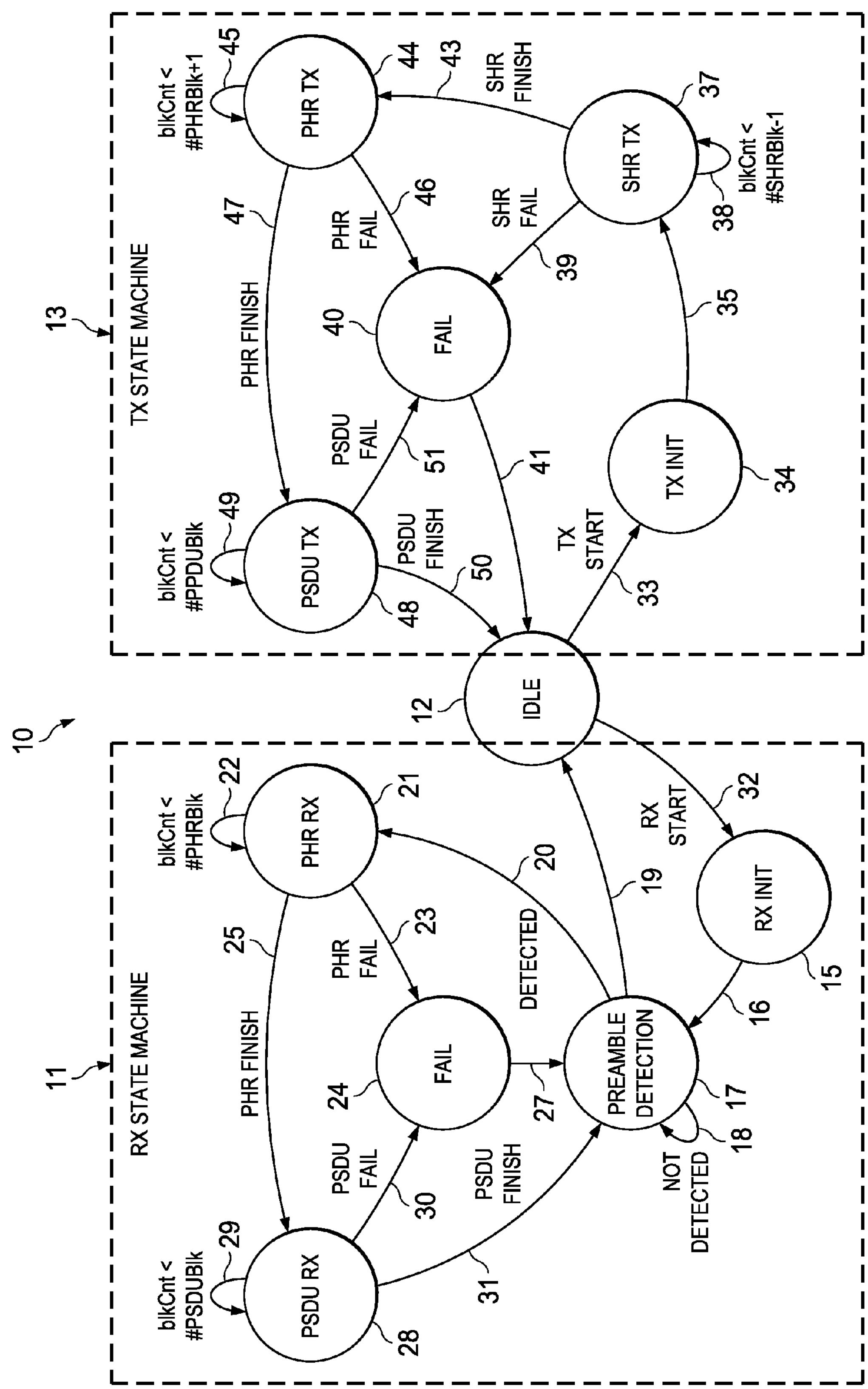
FIG. 2 is a diagram of a state machine for a typical software-defined TDD communication system.

FIG. 2 illustrates a state machine 10 for a software-defined TDD (time division duplex) communication system, TDD communication system state machine 10 includes a TX (transmitter) state machine 13 coupled in communication with a RX (receiver) state machine 11. The transmission system or "information package" that is transmitted by the transmitter may be encoded in three parts. The first part of the information package is called the "synchronization header" SHR. The synchronization header SHR RX for the receiver is used to detect the beginning of the signal transmitted by the transmitter. The receiver does not "know" when the transmitted signal begins, so the transmitter transmits the synchronization header SHR RX as the first part of the information package, followed next by a "physical layer header" PHR RX.

The physical layer header PHR RX may include various parameters, modulation information, and parameters that can be used to decode the rest of the information package. The receiver "synchronizes" to the transmitter by "detecting" the received synchronization header SHR RX at the beginning of the transmitted information package. In order to facilitate that detecting, the synchronization header SHR RX received by the receiver typically includes a repetitive pattern which may include a pseudorandom sequence of 1's and 0's located in the synchronization header at the beginning of the transmitted information package. The receiver then performs a correlation process on the repetitive code in the received synchronization header until a peak value of a correlation signal is achieved, and that peak value marks the beginning of the transmitted and received signal in the information package.

The transmitter transmits the information package including the synchronization header SHR RX followed by the physical layer PHR RX and then followed by the physical layer payload PSDU RX all in a single burst. The physical layer PHR RX typically includes digital signal processing information for decoding information and modulation information, and management information that controls transmission of the information package.

A "preamble detection" (PD) part of the receiver state machine is the part which detects the synchronization header that was transmitted by the transmitter and then received by the receiver in order to determine the time of occurrence of the beginning of the of the "actual" message contained in the received "physical layer payload" PSDU RX.

The receiver detects the transmitted synchronization header PHR RX at the beginning of the transmitted information package and then decodes the received physical layer header to obtain the modulation information utilized to demodulate the rest of the information package and then to decode the physical layer payload PSDU RX.

Still referring to FIG. 2, software state machine 10 is for a single-modulation system that includes a TX (transmitter) state machine 13 coupled by means of an idle routine or program 12 to a RX (receiver) state machine 11. TX state machine 13 begins operation in response to a TX start signal 33 from idle routine 12 to a TX initialization state 34. TX initialization state 34 advances via path (or process) 35 to a TX synchronization header or SHR TX state 37 which performs a repetitive process indicated by loop path 38. Normally, for transmission the transmission information packet is divided into multiple blocks of data, each of which corresponds to execution of a particular machine state. The synchronization header SHR TX may include multiple blocks that must be executed by that particular state of TX state machine 13, and "loop" 38 in FIG. 2 refers to repeated executions of SHR TX state 37 to finish executing the corresponding multiple blocks of SHR TX. If the synchronization header state 37 fails (for example, if synchronization header SHR TX includes three blocks of data but if after the first block is transmitted the hardware erroneously stops to transmit signals), that would be a failure, as indicated by path 39. In that case, TX state machine 13 goes into a fail state 40, and then returns to idle loop 12, as indicated by path 41. If processing of all blocks of synchronization header SHR TX in state 37 is successful or "finished" as indicated by path 43, TX state machine 13 advances to a physical header PHR TX state 44.

Physical header SHR TX includes the information regarding how to decode the rest of that information packet, for example, packet length, coding scheme, "whitening" scheme, etc, and undergoes repetitive processing of successive blocks of physical header PSDU TX as represented by arrow 45. If the PHR TX process or state "fails", TX state machine 13 advances to a fail state 40 as indicated by arrow 46. If the process of PHR TX state 44 finishes or succeeds, TX state machine 13 advances to a physical layer payload or PSDU TX state 48, as indicated by arrow 47, wherein the physical layer payload PSDU TX includes the body of the "actual" message/information to be transmitted to the receiver. If the processing indicated by arrow 49 of physical layer payload or PSDU TX fails, TX state machine 13 enters "fail" state 40, as indicated by arrow 51. If the processing 49 of physical layer payload state 48 is successful as indicated by arrow 50, TX state machine 13 goes to idle process 12.

RX state machine 11 operates in response to an RX start signal 32 produced by idle process 12 and received by RX initialization state 15. RX state machine 11 then advances to a "preamble detection" state 17, as indicated by arrow 16, to detect the synchronization header PHR RX of the received signal. If the process of preamble detection state 17 results in no preamble being detected as indicated by arrow 18, RX state machine 11 returns to idle process 12 as indicated by arrow 19. If a preamble is detected, as indicated by arrow 20, then RX state machine 11 advances to a physical layer header or PHR RX state 21 and repeatedly performs a process on separate blocks of the received data until execution of the entire PHR RX packet is complete, as indicated by arrow 22. If that process 22 fails as indicated by arrow 23, RX state machine 11 advances into a fail state 24 and then returns to preamble detection state 17 as indicated by arrow 27. If the process of PHR RX state 21 is successful as indicated by arrow 25, RX state machine 11 advances to a physical layer payload or PSDU RX state 28 in which a repetitive process is performed on chunks of data of the data of the information package, as indicated by arrow 29. If that state 28 fails, as indicated by arrow 31, then RX state machine 11 goes into its fail state 24. If the process 29 of the PSDU RX state 28 is completed as indicated by arrow 31, then RX state machine 11 advances into its preamble detection state 17.

Note that the software-defined TDD communication state machine 10 of FIG. 2 includes modifications of a typical software-defined TDD communication system to adapt it for use as a component of the embodiment of the invention of subsequently described FIGS. 3-9.

The state machine 10 of FIG. 2 has the characteristic that it always operates in a particular state and then advances to another next state. This means that it is not necessary to copy all of the program code from the flash memory into the RAM at the beginning of system. In accordance with the present invention, just the program code and constant code needed for operation in each particular state are copied from flash memory into RAM and then are utilized only in that state as it is being executed. Then, when the operating program advances to the next state, only the program code and constant code required during execution of that state is copied from flash memory to RAM. This technique is repeated for all of the other states of the state machine.

However, the foregoing approach requires that the code required for each state first be determined and then organized into "categories" in advance, and must then be accomplished by performing an analysis of the amount, timing, and operation of the code during execution of that state. This organization of code present in flash memory is referred to herein as "categorization", which is essentially the breaking of the code into smaller pieces to be copied from flash memory to RAM and then executed at various times by various states of a state machine. Each state of a state machine is triggered to execute or run in response to a particular interrupt and complete execution of one state may require multiple interrupts and executions of that state. The code being copied from the flash memory into RAM for these multiple executions or runs can help to reduce the "MIPS requirements" of the hardware. In response to any single interrupt, state machine 10 executes a single corresponding state by executing the code present in RAM required for that state. This effectively reduces the amount of expensive RAM required without substantially sacrificing system operating speed. After that state has been executed in the TX state machine 13 or the RX state machine, then all of the code in RAM for that category has been utilized in executing that state and therefore may no longer be needed in RAM, and therefore can be overwritten by transferring the code of another category in flash memory to that same "overlapping" portion of RAM.

Thus, the first step in accordance with the invention is the analysis and categorization of all of the program code and constant code that will be executed only once during operation of the software-defined TDD communication system, by in essence putting the code into different categories that can be used in RAM at different times for different purposes. After the architecture of the system has been designed, then the amount of RAM is required for each category is analyzed and it is determined which parts of the code in the flash memory can be assigned to which categories and machine states such that those parts of the code in a particular category are no longer needed after the state utilizing them has been executed. The RAM locations corresponding to those categories then can be overwritten with the code of un-executed or next-executing categories. Thus, after design of the software-defined TDD communication system has been completed, the categorization information is used "on-the-fly" to copy the various categories of program code and constant code from flash memory piece-by-piece into RAM as the system and state machine 10 of FIG. 2 is operated to advance through its various states.

Figure 1:
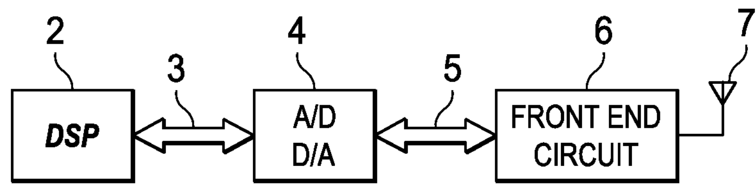
FIG. 1 is a block diagram of a typical software-defined communication system.
Figure 3:
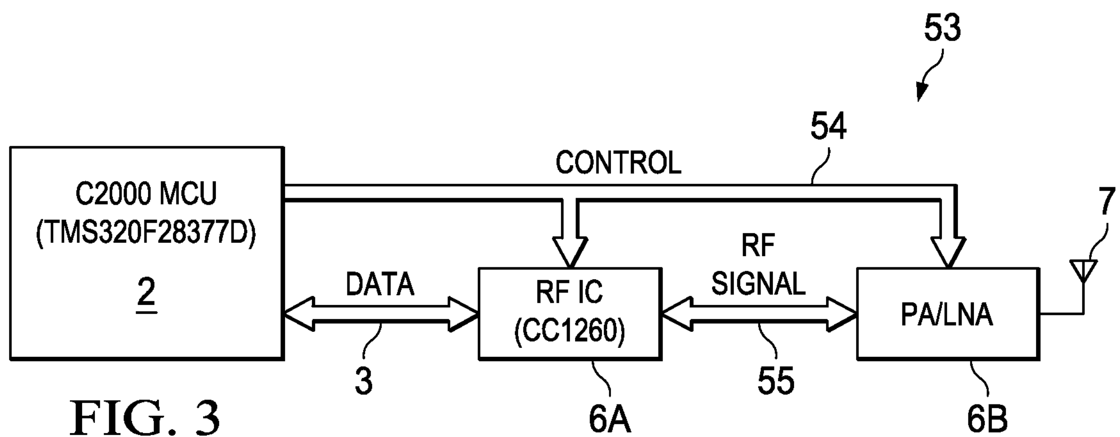
FIG. 3 is a block diagram of one implementation of the present invention.

FIG. 3 shows a basic software-defined TDD communication system 53 that includes a DSP 2 (which can be a Texas Instruments C2000 microcontroller, product number TMS320F28377D, that is coupled by a bidirectional digital bus 3 to RF (radio frequency) front end circuitry 6A (which can be a Texas Instruments product number CC1260). Suitable analog-to-digital and digital-to-analog conversion circuitry is included in RF front end circuitry 6A and is coupled by a bidirectional RF signal bus 5 to PA (power amplifier)/LNA (low noise amplifier) circuitry 6B which is connected to an RF antenna 7.

One embodiment of the invention includes a software-defined single-modulation TDD communication system, wherein the modulation can be OFDM (orthogonal frequency-division multiplexing), DSSS (direct-sequence spread spectrum), FSK (frequency shift keyed) or any other suitable modulation scheme. Some kinds of modulation, including OFDM, may include different data rate modes in accordance with a modulation coding set (MCS) having different coding rate modes. Other embodiments of the software-defined TDD communication system of the present invention may include multiple modulations and multiple preamble detection.

In accordance with the present invention, the program code section and the constant value code section which are initially stored in flash memory are divided into a number of different categories according to (1) when in the communication process the program code of each category needs to be copied into RAM, and also (2) how available RAM space is to be shared with various categories. The categories of program code and/or constant value code to be copied from flash memory are transferred into RAM accordingly, generally in accordance with the decision tree flowchart of subsequently described FIG. 6. In the categorization process, some program code and/or some constant value code is copied in an earlier state but is only utilized in a subsequent state. This is because sometimes it is desirable to make use of the "MIPS headroom" in early states of operation of the software-defined TDD communication system in order to "equalize the MIPS" associated with the different states of the software-defined TDD communication system.

All of the above mentioned categories in the described example are listed below in Table 1. Table 1 illustrates the "sharing" or "reuse" of physical RAM at different times among the various different states indicated in Table 1. This information indicates how the amount of required physical RAM can be substantially reduced compared to the total amount of physical RAM required in a conventional software-defined TDD communication system.

TABLE 1

Categories of Program Code Sections and Constant Code Sections to Be Executed in RAM

| Category | When to copy into RAM* | Overlapping | Description |
|---|---|---|---|
| CAT0 | At system initialization | No overlapping | It includes the constant variables which are frequently used in multiple states or cannot be copied in other states due to MIPS overhead. |
| CAT1-a | At TX init | With CAT 2/3/4/5/6 | It includes the constant variables only running at SHR TX state. |
| CAT1-b | At TX init | With CAT 3/4/5/6 | It includes the constant variables used at PHR TX states, not at PDSU TX. It may also be used at SHR TX. |
| CAT1-c | At TX init | With CAT 4/5/6 | It includes the constant variables running in PDSU TX states. They may also be used in SHR/PHR TX. |
| CAT2-a | At TX init or SHR TX | With CAT 1a/3/4/5/6 | It includes the constant variables which are only used in PHR TX state. The part overlapping with CAT 1a should be copied when SHR TX state finishes. |
| CAT2-b | At TX init or SHR TX | With CAT 1a/4/5/6 | It includes the constant variables which are used in PSDU TX states. It may be also used PHR TX. The part overlapping with CAT 1a should be copied when SHR TX state finishes. |
| CAT3 | At TX init or SHR TX or PHR | With CAT 1a/1b/2a/4/5/6 | It includes the constant variables which are only used at PSDU TX state. The part overlapping with CAT 1a/1b/2a should be copied after their completion. |
| CAT4-a | At RX init | With CAT 1/2/3/5/6 | It includes the constant variables that are only used at preamble detection state. |
| CAT4-b | At RX init | With CAT 1/2/3/6 | It includes the constant variables which are used at PHR RX state, but not PSDU RX. It may also be used at preamble detection state. |
| CAT4-c | At RX init | With CAT 1/2/3 | It includes the constant variables running in PSDU RX state. It may also run at preamble detection state and PHR RX state. |
| CAT5-a | At RX init or Preamble Detection | With CAT 1/2/3/4a/6 | It includes the constant variables which are only used in PHR RX state. The part overlapping with CAT 4a should be copied when preamble detection state finishes. |
| CAT5-b | At RX init or Preamble Detection | With CAT 1/2/3/4a | It includes the constant variables which are used in PSDU RX states. It may also be used at PHR RX. The part overlapping with CAT 4a should be copied when preamble detection state finishes. |

TABLE 1-continued

Categories of Program Code Sections and Constant Code Sections to Be Executed in RAM

| Category | When to copy into RAM* | Overlapping | Description |
|---|---|---|---|
| CAT6 | At RX init or Preamble Detection or PHR RX | With CAT 1/2/3/4a/4b/5a | It includes the codes and constant variables which are only used at PSDU RX state. The part overlapping with CAT 4a/4b/5a should be copied after their completion. |

*Note that if a portion of the copying from flash memory to RAM occurs at the beginning of a particular state, that copied data is used as if it occurred in the immediately previous state.

The state machine shown in previously described FIG. 2 is utilized in a software-defined TDD communication system which includes the above mentioned dynamic sharing of RAM and the associated categorization of the program code sections and constant value code sections which are initially stored in flash memory and then are copied into RAM.

In a software-defined TDD communication system, after a digital front end (DFE) circuit accumulates a certain number of samples referred to as a "block" of data samples, the DFE generates an interrupt signal. The interrupt signal triggers the running of a state machine, such as the state machine shown in FIG. 2, causing it to advance to the next state of the state machine. Ordinarily, multiple blocks of data samples are partly or completely required to "finish" the processing required for a single state, and the state machine then advances to its next state. This feature of a conventional software-defined TDD communication system allows the dynamic RAM sharing described herein to occur, wherein the various program code sections and the constant code sections stored in flash memory are copied into different sections of RAM during processing of the blocks of data so as to reduce the peak MIPS requirement of the overall software-defined TDD communication system, and thereby make the RAM less expensive. The MIPS requirements of the various different states of the state machines of the software-defined TDD communication system may be substantially different.

Typically, in a one-modulation system the various states, including preamble detection, PHR RX (physical layer header for receiver), SHR TX (synchronization header for transmitter), and PHR TX (physical layer header for transmitter), may have relatively low MIPS requirements. Consequently, various program code sections and constant code sections stored in flash memory can be copied from flash memory into physical RAM in such a way that the overall peak MIPS requirement of the software-defined TDD communication system does not increase.

For program codes and/or constant value codes that are to be copied from flash memory into RAM during a next state, wherein use of RAM in that next state does not overlap with the present usage of RAM in the present state, those program codes and/or constant value codes are copied from flash memory during the present state and are distributed into each processing of block data. For those program codes or constant value codes which are not copied into RAM during the present state, they are copied from flash memory into RAM at the beginning of the next state if that next state requires a lower MIPS data rate, or at the end of the present state if the present state requires a lower MIPS data rate.

If some program codes and/or constant value codes need to be copied from flash memory into RAM before a particular state and if before that state the software-defined TDD communication system does not provide sufficient MIPS capability to allow that, then those program codes or constant value codes are put into the CAT1 (TX) or CAT4 (RX) category. This means those program codes and/or constant value codes would be copied from flash memory to RAM during either the TX initialization process or the RX initialization process. If too much program code needs to be copied from flash memory to RAM, the system may not be able to afford to copy it from flash memory to RAM during the middle states or "mid-states" of the state machine. Then it is necessary to copy that program code from flash memory to RAM at the beginning, for TX initialization 34 or RX initialization 15. Between TX initialization 34 and RX initialization 15, the program code can still dynamically share RAM.

Figure 4:
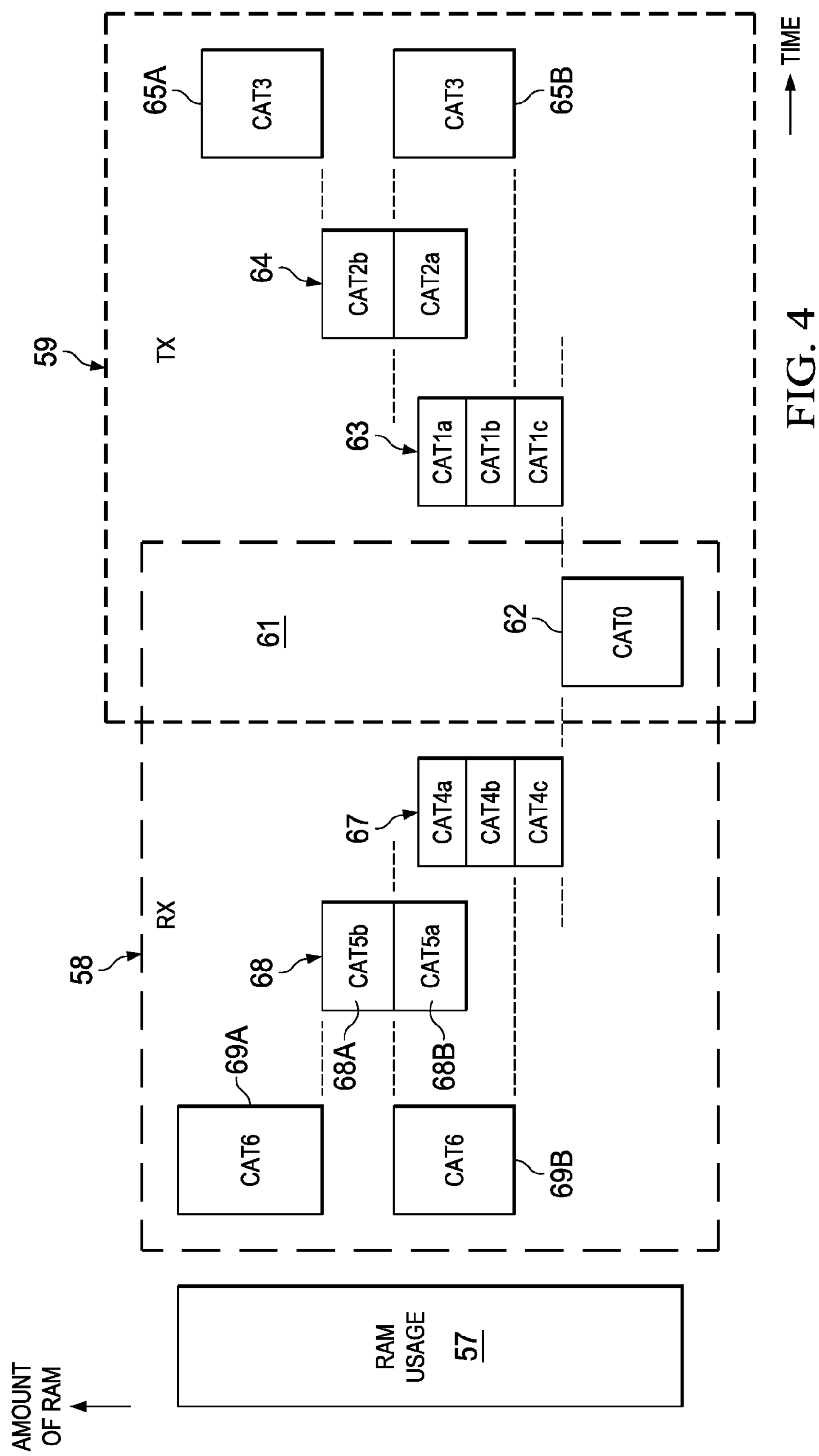
FIG. 4 is a diagram illustrating an example of how dynamic RAM sharing can be accomplished for multiple categories of program code and constant value code determined in accordance with the particular times at which the sections are to be copied from flash memory into RAM and how RAM can be dynamically shared for particular categories.

FIG. 4 indicates dynamic RAM sharing among different states of a software-defined TDD communication system. In FIG. 4, the RAM usage of the software-defined TDD communication system is indicated by reference numeral 57. The vertical dimension in FIG. 4 indicates how much RAM space is being used by the categories in Table 1. The horizontal dimension indicates the time or order in which different sequential states of the TX state machine 13 and RX state machine 11 of FIG. 2 are executed. If multiple indicated categories in FIG. are located at the same vertical "elevation" in FIG. 4, that means the categories are "overlapping" each other; that is, such categories occupy the same locations of RAM but at different times during execution of different states of state machine 10 in FIG. 2.

Figure 5:
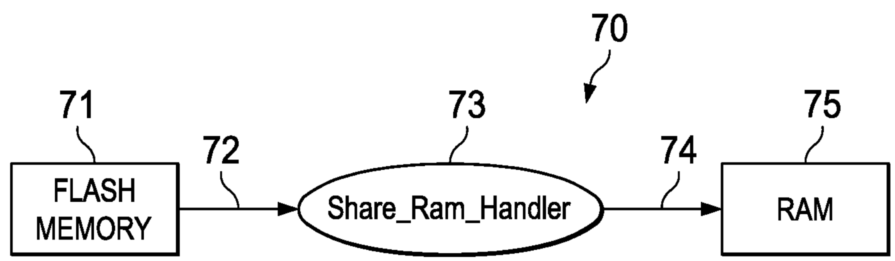
FIG. 5 is a flowchart of a dynamic RAM sharing program utilized in conjunction with one implementation of the invention as indicated in FIGS. 3 and 4.

FIG. 5 shows a block diagram including a program RAM Sharing Manager Module 73 which operates to manage the copying of program code and/or constant value code from the flash memory 70 to RAM. In FIG. 5, a memory subsystem 70 includes a flash memory 71 coupled by a bus 72 to the input of RAM Sharing Manager Module 73. The output of RAM Sharing Manager Module 73 is connected by a digital bus 74 to RAM 75. RAM sharing manager module 73 maintains a software structure which records the origination pointer and the destination pointer and the size of each program code section and of each constant value code section, as indicated in the following coding:

```
typedef struct
{
UINT32        *source_pointer[NUM_CAT];
UINT32        *destination_pointer[NUM_CAT];
UINT16        size[NUM_CAT];
UINT16        copied_size[NUM_CAT];
}ram_sharing_handler;
```

Since the above mentioned copying is from flash memory 71 to RAM 75, a first pointer called the "source pointer"

points to location addresses in flash memory 71, and a second pointer called the "destination pointer" points to address locations in RAM. For example, the code category for category CAT1 initially is stored in flash memory 71. When the code of category CAT2 is later copied from flash memory 71 to RAM 75, the known locations in RAM 75 into which the code of category CAT2 is copied are pointed by the destination pointer for that code. Note that some or all of the code of any category may be broken up into a number of smaller blocks of code of known size(s). The "argument" [NUM_CAT] of the above-indicated source pointer may designate any particular sub-block of the category being copied from flash memory 71 into RAM 75.

It should be noted that in a practical system some of the categories may be empty, and a single category may be broken into different sections which may be fit into corresponding small available sections of RAM 75. "Empty" categories can be completely removed from the software structure.

RAM Sharing Manager Module 73 also provides several additional functions, including an initialization function and the function of copying from flash memory to RAM. The initialization function initializes the source pointers, destination pointers, and size of a block in each category. For a particular software-defined TDD communication system, the dynamic RAM sharing system is pre-designed. An example of a software "function definition" for flash memory-to-RAM sharing operation of RAM sharing handler 73 is indicated below by:

Void Ram_sharing_to_RAM (UINT16 section index, UINT16) (copy_size)

The above indicated "section index" or category index is known and is provided as an input to RAM sharing handler 73. All other required information is stored in the RAM sharing handler 73.

The input parameters for a single execution of a state in response to a single interrupt of that state include the section index and section size to copy for each execution of the state. In the flash-memory-to-RAM copy function, RAM Sharing Manager Module 73 chooses the section of code to copy from the flash memory according to the section index, and also tracks the copied size of that section of code. A copying of code by TX state machine 13 in FIG. 2 includes, in sequence, TX initiation code, synchronization header SHR TX code, and physical header PHR TX code. A copying of code by RX state machine 11 includes, in sequence, RX initiation code, preamble detection (PD) code, and physical header PHR RX code. A state machine may stay in one state for more than one "execution". If necessary, the code copied can be divided into multiple blocks of code and then each block can be copied individually from flash memory into RAM during corresponding "executions" of the state. The flash memory-to-RAM copying function also includes "distributing" the multiple blocks of copied code into the designated locations of RAM 75.

The foregoing copy function allows the user to control the number of words to copy for a single execution of the state machine in response to a single interrupt into a certain block processing. This allows the user to distribute the code copied from the flash memory 70 into different block processing operations within one state. Table 2 shows an example of memory usage in a one-modulation software-defined TDD communication system:

TABLE 2

An example of modulation system memory usage

| | CAT0 | CAT1 | CAT2 | CAT3 | CAT4 | CAT5 | CAT6 |
|---|---|---|---|---|---|---|---|
| Size (byte) | 1k | a: 0.5 kB<br>b: 0.4 kB<br>c: 0.1 kB | a: 0.5 kB<br>b: 0.6 kB | 0.7 kB | a: 0.6 kB<br>b: 0.3 kB<br>c: 0.2 kB | a: 0.7 kB<br>b: 0.5 kB | 0.9 kB |

During system initialization the code of category CAT0 in the example of Table 2 is copied from flash memory 70 (FIG. 5) to RAM 75 (FIG. 5) and always occupies that part of RAM 75. For the TX (transmission) initialization state 34 in TX state machine 13 of FIG. 2, all of the code of category CAT1 in the example of Table 2 is copied into RAM 75. The state machine 10 of FIG. 2 then goes to goes to SHR TX (synchronization header) state 37, as indicated by arrow 35. Since the SHR TX state 37 has a low associated MIPS and the code of category CAT2b does not overlap with present RAM usage, the code of category CAT2b is distributed into several data or processing "blocks". If four data blocks are required to distribute or finish the TX synchronization header SHR TX in state 37, then 0.15 kB in each such data block is copied into RAM 75. When the last block of synchronization header SHR TX in state 37 (FIG. 2) is finished (which can be at the end of the last SHR TX block or at the very beginning of the first physical layer header PHR TX block in state 44), the code of category CAT2a is copied into RAM 75 and "overlaps" with category CAT1a in RAM 75. Then TX state machine 13 goes to physical layer header PHR TX, as indicated by arrow 43.

Since category CAT3 can be fit into categories CAT2a+CAT1b in RAM 75, copying from flash memory 70 does not occur during processing or execution of physical layer header PHR TX. Because physical layer header PHR TX has a lower associated MIPS than physical layer payload PSDU TX, the CAT3 code is copied into RAM 75 during the execution of the previous of last block of PHR TX. It should be noted that if the present modulation includes different MCS (modulation coding set) modes or rate modes, only the part that relates to the selected MCS mode or rate mode is copied from flash memory 71 to RAM 75. In the example of Table 2, the overall category CAT3 may be 1.5 kB (kilobytes), and the part of that related to the selected MCS is only 0.7 kB, so only 0.7 kB is copied from the flash memory 70 into RAM 75.

For the RX (receiving) initialization state 15 in RX state machine 11 of FIG. 2, all of the category CAT4 code is copied into RAM 75, and then RX state machine 11 of FIG. 2 goes into its preamble detection state 17, as indicated by arrow 16. In some software-defined TDD communication systems, the preamble detection state has a relatively high MIPS requirement, while in other such systems the preamble detection state may have relatively low MIPS requirements. In the example of Table 2, it is assumed that preamble detection state 17 is associated with a relatively low MIPS. Category CAT5a has a size of 0.7 kB of which 0.6 kB can overlap with category CAT4a, so the remaining 0.1 kB of CAT5a and the category CAT5b code do not overlap with the present RAM usage. This 0.5+0.1 kB is distributed or copied into RAM 75 during the preamble detection process 17 of preamble detection state 17. In this case, it is assumed that the preamble detection process requires at least 4 data blocks in order to advance to the next state, wherein 0.15 kB are copied from flash memory 70 into RAM 75 for each such data block.

At the beginning of physical layer header PHR RX in state 21 of RX state machine 11, 0.6 kB of code from category CAT5a is copied into RAM 75, which was also occupied by the category CAT4a code. Then RX state machine 11 starts to execute or run the physical layer PHR RX code, as indicated by arrow 25. Since the code of category CAT6 can be fit into the same RAM space as category CAT5a+CAT4b, no copying from flash memory 71 into to RAM 75 occurs during physical layer header PHR RX during state 21 in RX state machine 11. Since the physical layer header PHR RX state 21 has a lower MIPS requirement than is required in physical layer payload PSDU RX state 28, the category CAT6 code can be copied from flash memory 70 into RAM 75 during the last data block from physical layer header PHR RX in state 21 of RX state machine 11. As previously explained for TX state machine 13, if the single modulation scheme has a different MCS or rate mode, only the part that relates to the selected MCS or rate mode is copied from flash memory 70 into RAM 75. In the example of Table 2, during the combined operation of TX state machine 13 and RX state machine 11, the code of categories CAT1, CAT2, and CAT3 can share RAM with categories CAT4, CAT5, and CAT6.

It should be understood that the purpose of distributing the data copied from flash memory 70 into different data blocks is to equalize or balance the various MIPS requirements among different data blocks in different stages of the operation of the state machines. The distribution scheme may be different in different implementations because of trade-offs between RAM usage and execution speed. For example, in some software-defined TDD communication systems the duration of the first physical header PHR RX block is shorter than durations of other states due to the synchronization accomplished by the synchronization header SHR RX, and less data copied to RAM 75 from flash memory 71 would be distributed at the first PHR RX block.

Figure 6:
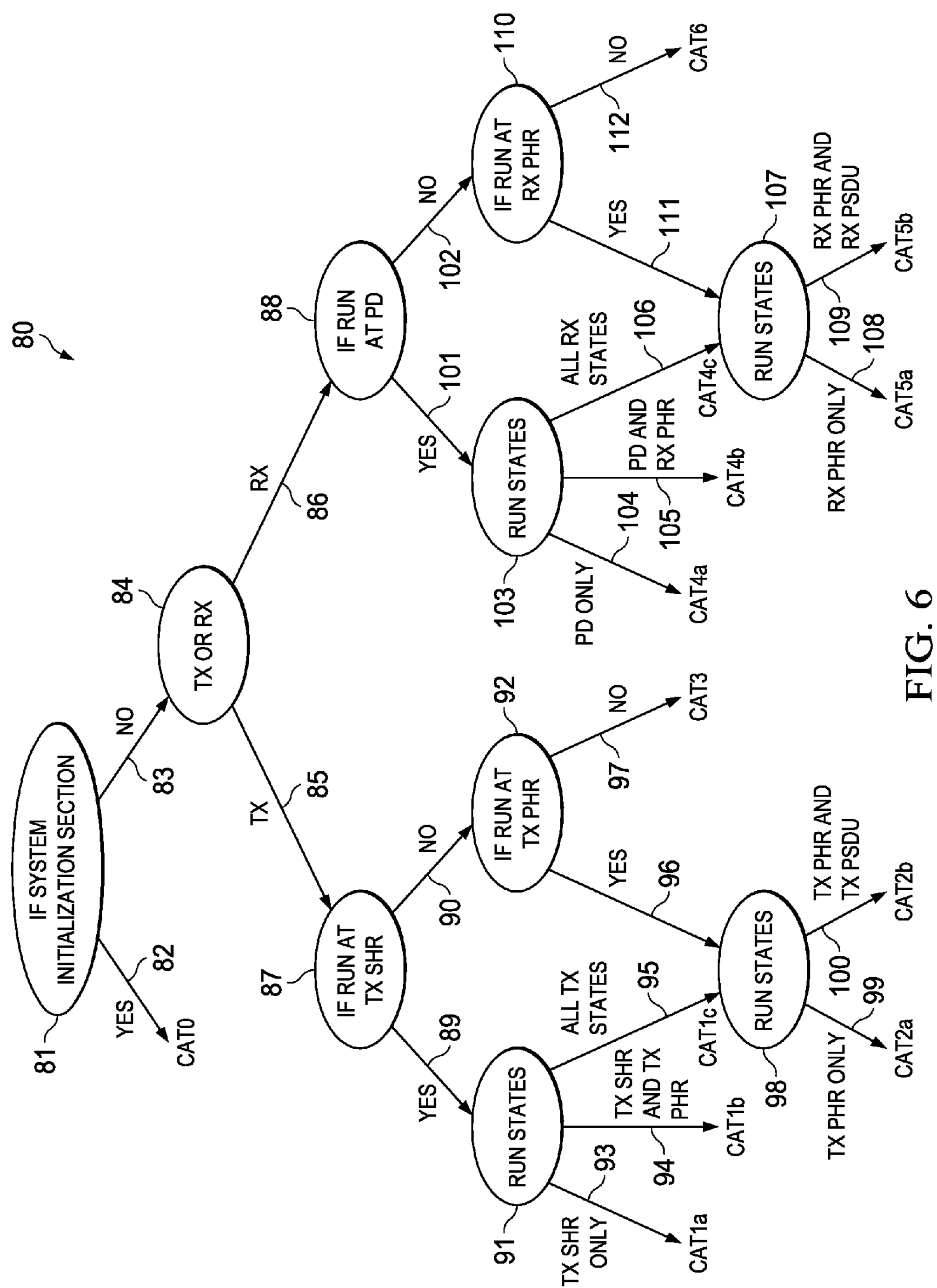
FIG. 6 is a flowchart of decision tree that indicates categorizing of program code and/or constant value code of a one-modulation software-defined TDD communication system of the embodiment of the invention indicated in FIGS. 3-5.

FIG. 6 shows how all of the categorizations indicated in Table 1 and FIG. 4 are made according to (1) when each category needs to be copied into RAM and (2) how code in that category is to be dynamically shared at different times in particular locations of RAM with the code in other categories. In FIG. 6, flowchart 80 indicates how the various predetermined categories of program code and constant value code initially stored in flash memory 70 are subsequently individually copied into RAM 75 as the TX state machine 13 and RX state machine 11 of FIG. 2 are executed.

In decision label or process 81, the system operating program determines if the state machine 10 of FIG. 2 is performing a TX or RX initialization. If this determination is affirmative as indicated by arrow 82 in FIG. 6, then each particular program to be executed passes through decision tree 80 of FIG. 6 to determine which “shared” category it belongs to. That is, decision tree 80 determines which program code belongs to which of the categories of FIG. 4 and Table 1. The times at which the code of each category is to be copied from flash memory 71 to RAM 75 are defined in Table 1.

If the determination of decision label or process 81 is negative as indicated by arrow 83, then the program goes to decision label or process 84 and determines whether the next step in the program is performed by TX state machine 13 as indicated by arrow 85 or by RX state machine 11 of FIG. 2 as indicated by arrow 86. If the next step is performed by TX state machine 13 as indicated by arrow 85, then the program goes to decision label or process 87 and determines if TX state machine 13 is presently executing a synchronization header SHR TX.

If the determination of decision label or process 87 is affirmative (i.e., is that TX state machine 13 is executing the synchronization header SHR TX) as indicated by arrow 89, then label or process 91 determines whether TX state machine 13 is to execute only synchronization header SHR TX as indicated by arrow 93, or is to execute both synchronization header SHR TX and physical layer PHR TX as indicated by arrow 94, or is to execute all TX states including SHR TX, PHR TX, and PSDU TX.

In the case of arrow 93, TX state machine 13 copies category CAT1a from flash memory 71 to RAM 75. In the case of arrow 94, TX state machine 13 copies category CAT1b from flash memory 71 to RAM 75. If the determination of decision label or process 87 is that TX state machine 13 is to execute all states including synchronization header SHR TX, physical layer PHR TX, and physical payload PSDU TX as indicated by arrow 95, then TX state machine 13 copies category CAT1c from flash memory 71 to RAM 75. In the latter case, the system operating program then enters label or process 98.

In label or process 98, the TX state machine 13 checks to determine which “run states” TX state machine 13 is to execute. If the determination of decision label or process 98 is that TX state machine 13 is to execute only physical layer PHR TX as indicated by arrow 99, then the TX state machine 13 copies category CAT2a from flash memory 71 into RAM 75. If the determination of decision label or process 98 is that TX state machine 13 is to execute both physical layer PHR TX and payload PSDU TX as indicated by arrow 100, then the TX state machine 13 copies category CAT2b from flash memory 71 into RAM 75.

If above-mentioned decision label or process 84 determines that the next step is to be performed by RX state machine 11 as indicated by arrow 86, then RX state machine 11 goes to decision label or process 88 and determines if RX state machine 11 is to execute a preamble detection process. If the determination of decision label or process 88 is affirmative as indicated by arrow 101, then RX state machine 11 goes to label or process 103 to determine whether RX state machine 11 is to execute only preamble detection PD as indicated by arrow 104. If that is the case, then RX state machine 11 copies the code of category CAT4a from flash memory 71 to RAM 75. If the determination of decision label or process 103 is that RX state machine 11 is to execute both preamble detection PD and physical header PHR RX as indicated by arrow 105, then RX state machine 11 copies category CAT4b from flash memory 71 to RAM 75. If the determination of decision label or process 103 is that RX state machine 11 is to execute all possible RX states indicated by arrow 106, then the program goes to label or process 107.

If the determination of decision label or process 88 is negative (i.e., RX state machine 11 is not to execute preamble detection PD) as indicated by arrow 102, then RX state machine 11 goes to decision label or process 110 and determines if physical header PHR RX is to be executed. If this determination is affirmative as indicated by arrow 111, then RX state machine 11 goes to decision label or process 107. In decision label or process 107, RX state machine 11 checks to determine which run states RX state machine 11 is to execute. If the determination of decision label or process 107 is that RX state machine 11 is to execute only physical layer PHR RX as indicated by arrow 108, then the RX state machine 11 copies category CAT5a from flash memory 71 into RAM 75. If the determination of decision label or process 107 is that RX state machine 11 is to execute both physical layer PHR RX and payload PSDU RX as indicated by arrow 109, then the system program copies category CAT5b from flash memory 71 into RAM 75.

If the determination of decision label or process 110 is negative as indicated by arrow 112, then the RX state machine 11 copies category CAT6 from flash memory 71 into RAM 75.

Subsequently described Table 3 shows an example of RAM usage in a software-defined TDD multi-modulation communication system having three different kinds of modulation, referred to as Modulation 1 (MOD1), Modulation 2 (MOD2), and Modulation 3 (MOD5). Multi-modulation means that a modem of the system can simultaneously detect multiple different types of "preambles" for different kinds of modulation, for example FSK, OFDM, and DSSS.

It should be noted that for TX operation, the software-defined TDD multi-modulation communication system runs only a single selected kind of modulation at a time. This aspect of the TX state machine is the same as for either a single-modulation system or a multi-modulation system.

Sometimes, in a particular communication link there are a number of different signals having different kinds of modulation. A single communication information package includes a synchronization header SHR, a physical layer header PHR that encodes the modulation, and other information including the physical layer payload. For example, if it is known that FSK modulation is being used for a particular signal, then FSK technology must be utilized to detect the information in synchronization header SHR and then detect a corresponding peak in a resulting correlation signal. Then the physical header PHR is decoded and the rest of the operations indicated in RX state machine 11 of FIG. 2 are performed.

However, if there are two signal modulation options, such as FSK and OFDM, which may be simultaneously present in the same signal, then the RX state machine 11 in FIG. 2 does not know in advance whether the received synchronization header is a FSK header or a OFDM header. In that case it is necessary for RX state machine 11 to perform two preamble operations in parallel in order to detect whether a FSK synchronization header or a OFDM synchronization header is present.

Figure 7:
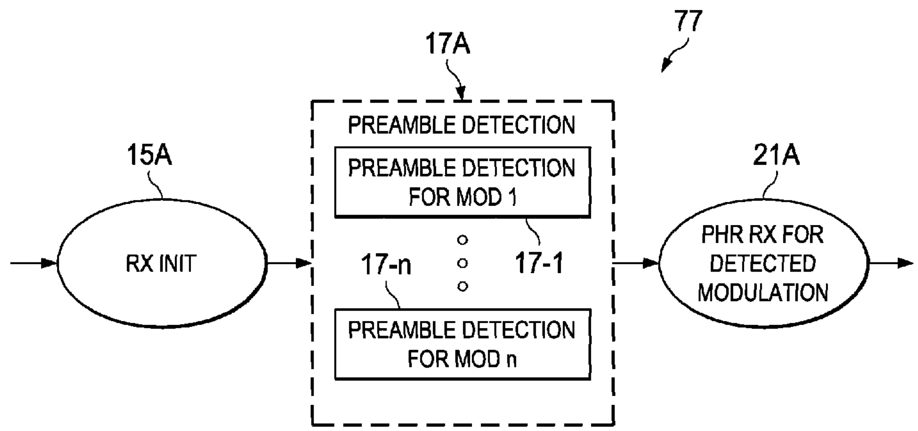
FIG. 7 is a block diagram of a preamble detection state machine in a multi-modulation software-defined TDD communication system.
Figure 8:
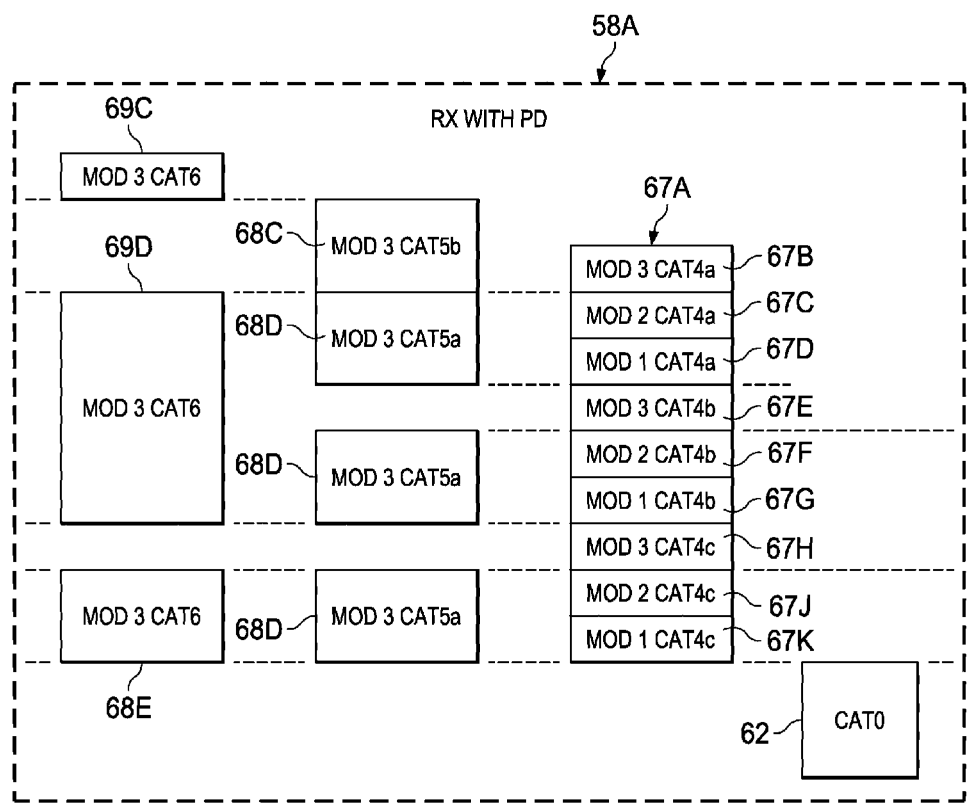
FIG. 8 is a block diagram of a preamble detection state machine illustrating an example of how dynamic RAM sharing can be accomplished in a multi-modulation software-defined communication system for categories of program code and constant value code sections determined in accordance with when the sections are to be copied from flash memory into RAM and how RAM can be dynamically shared for particular categories.

The various categories of previously described FIG. 4 also correspond generally to the same kind of state machine operation regardless of whether the TX and RX signals for the software-defined TDD communication system have only a single modulation or multiple modulations, except that for the case of multiple modulation the preamble detection state 17 in RX state machine 11 of FIG. 2 is replaced by parallel multiple preamble detection state 17A of FIG. 7, wherein the receive operation includes "n" multiple preamble detections MOD1, MOD2, . . . MODn all running in parallel, one for each of the multiple modulation options, in order to detect the particular kind of modulation that is present. PHR RX physical header state 21A in FIG. 7 corresponds to physical header state 21 in FIG. 2 for the case of multiple-modulation operation. Note that RX initialization 15 in FIG. 2 basically similar to RX initialization 15A in FIG. 7.

More specifically, FIG. 7 indicates the preamble detection (PD) state machine 77 for a software-defined TDD multi-modulation communication system. PD state machine 77 includes an RX initialization state 15A, and also includes a preamble detection system 17A which includes n preamble detection sections 17-1, 2, . . . n for different modulations MOD1, 2, . . . n, respectively, Preamble detection module or state 17A is followed by a PHR RX state 21A which corresponds to the presently detected modulation. For RX operation when in a preamble detection state 17A as indicated in FIG. 7, the multiple preamble detections (MPD) for Modulation 1, 2. . . n run in parallel. Once one of the preambles 17-1, 2 . . . n is detected, then the RX state machine advances to the PHR RX state 21 in FIG. 2 or the PSDU RX state 28 in FIG. 2 corresponding to the selected preamble.

The size (in kilobytes) for each category for each kind of modulation is shown below in Table 3. (Note that in Table 3, program code is not distinguished from constant value code, since the same methodology applies to each.)

TABLE 3

An example of multiple modulation system memory usage

| | CAT0 | CAT1 | CAT2 | CAT3 | CAT4 | CAT5 | CAT6 |
|---|---|---|---|---|---|---|---|
| Modulation 1 | 1k | a: 0.5 kB<br>b: 0.4 kB<br>c: 0.1 kB | a: 0.3 kB<br>b: 0.7 kB | 0.7 kB | a: 0.6 kB<br>b: 0.3 kB<br>c: 0.3 kB | a: 0.7 kB<br>b: 0.3 kB | 0.9 kB |
| Modulation 2 | 1k | a: 0.3 kB<br>b: 0.3 kB<br>c: 0.3 kB | a: 0.5 kB<br>b: 0.6 kB | 0.8 kB | a: 0.6 kB<br>b: 0.4 kB<br>c: 0 kB | a: 0.6 kB<br>b: 0.5 kB | 0.7 kB |
| Modulation 3 | 1k | a: 0.6 kB<br>b: 0.2 kB<br>c: 0.1 kB | a: 0.5 kB<br>b: 0.3 kB | 0.6 kB | a: 0.6 kB<br>b: 0.5 kB<br>c: 0.1 kB | a: 0.7 kB<br>b: 0.3 kB | 0.6 kB |

During system initialization, category CAT0 is copied from flash memory 71 into RAM 75 and would always occupy that part of RAM 75. For TX operation, it is assumed for this example that modulation MOD1 is selected. During TX initialization, the category MOD1 CAT1 is copied into RAM 75, and then the RX state machine advances to the state MOD1 SHR TX. In this example, 0.5 kB of category CAT2b does not overlap with the current RAM usage (category CAT2a+0.2 kB of category CAT2b that can be fit into category CAT1a), so the 0.5 kB of category CAT2b copied from flash memory 70 is distributed into several data blocks. If four data blocks are required to finish the processing by state SHR TX, then 0.125 kB in each data block is copied into RAM 75. Category CAT2a and the remaining 0.2 kB thereof are copied into RAM 75 later. When the last data block of the SHR TX state is completed, category CAT2a and the remaining 0.2 kB of category CAT2b are copied into RAM 75 and overlap therein with category CAT1a. The TX state machine then advances to its PHR TX state. Since category CAT3 can be fit into the combined categories CAT2a plus CAT1b, copying from flash memory 70 into RAM 75 does not occur during the PHR TX state, and since the MIPS requirement of the PHR TX state is less than for the PSDU TX state, category CAT3 is copied into RAM 75 during the last data block of the PHR TX state. Note that if the selected modulation has a different MCS (modulation coding set) or rate mode, only the part of category CAT3 relates to the selected MCS or rate mode is copied from flash memory 70 into RAM 75. For example, category CAT3 may be 1 kB, and those categories related to the selected MCS, for example, MCS 1, are only 0.7 kB, and in this case only 0.7 kB is copied from flash memory 70 into RAM 75.

For RX operation, it is again assumed for this example that modulation MOD1 is selected. During RX initialization, all of categories CAT4 MOD1, CAT4 MOD2, and CAT4 MOD3 are copied into RAM 75, and then the RX state machine advances to its Preamble Detection mode. For a multiple-modulation software-defined TDD system, the preamble detection mode has a relatively high MIPS requirement, since multiple preamble detections are running in parallel. Furthermore, category CAT5 of any particular modulation may be "overlapped" in RAM with respect to MOD1 CAT4 and MOD2 CAT4, so no copying from flash memory into RAM during preamble detection occurs during preamble detection. At the beginning of the PHR RX state, category Cat5 is copied from flash memory 70 to RAM 75, and then the RX state machine starts to execute PHR RX code, Category CAT5 can overlap with category MOD1 CAT4 or MOD2 CAT4. Since category MOD3 CAT6 can be fit into the remaining space from categories MOD1 CAT4 and MOD2 CAT4, category MOD3 CAT4 does not need to overlap with category MOD3 CAT5a. Instead, MOD3 CAT4 can overlap with the remaining from categories MOD1 CAT4 and MOD2 CAT4 after MOD3 CAT5. The copy of MOD3 CAT6 can be distributed into each data block of the PHR RX state of the RX state machine. In this example, it is assumed that three data blocks are required for category MOD3 in the PHR RX state. Since category MOD3 CAT4 is copied at the beginning of the PHR RX state, the first data block does not copy category MOD3 CAT6. Category MOD3 CAT6 is copied only during the second and third data blocks. During each data block, 0.3 kB are copied from flash memory 71 into RAM 75. Note that if the selected modulation has a different MCS (modulation coding set) or rate mode, only the part that relates to the selected MCS or rate mode is copied from flash memory 70 into RAM 75. Note that if the selected modulation has a different MCS (modulation coding set) or rate mode, only the part that relates to the selected MCS or rate mode is copied from flash memory 70 into RAM 75.

Note that if it is excessively difficult to break a data block of code into two pieces, then during TX initialization an alternative procedure is to assign category MOD1 CAT2a so as to use category MOD1 CAT1a such that the entire category MOD1 CAT2b does not overlap with category MOD1 CAT1a. Then the copy of 0.7 kB category MOD1 CAT2b can be distributed into each data block. If it requires 4 data blocks to finish the SHR TX state, 0.175 kB is copied from flash memory 71 into RAM 75 for each data block. When the last block of the SHR TX state is complete, category CAT2a, which overlaps with category CAT1a is copied from flash memory 70 into RAM 75. The TX state machine then goes into its PHR TX state.

Figure 9:
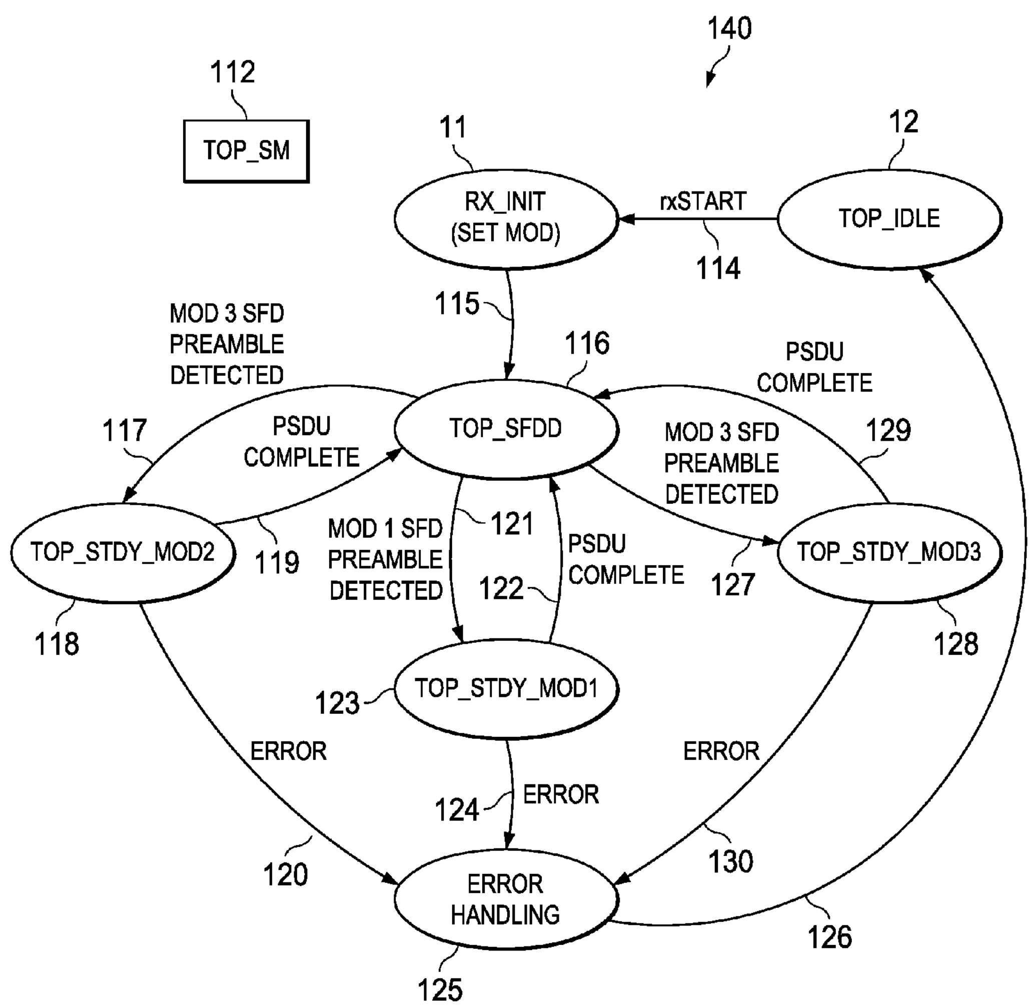
FIG. 9 is a diagram of a receiver state machine which can simultaneously detect multiple preambles.

FIG. 9 shows a "top level" representation of a RX (receiver) state machine 140 which is capable of simultaneously running three different modulations of the physical layer payload PSDU RX whereas the lower level representation in FIG. 2 is only capable of running a single modulation of the physical layer payload PSDU RX being processed (see FIG. 2). Note that in the TOP_STDY_MOD1, TOP_STDY_MOD2, and TOP_STDY_MOD3 terms in labels 123, 118, and 128, respectively, the term "STDY" means "steady state", the term "TOP" refers to the "top level" representation of state machine 140, and the term "MOD" means "modulation". ("Steady state" means the state for PHR RX and PDSU RX. In preamble detection, it is not known when the incoming signals will arrive. Once the preamble is detected, the receiver synchronizes to the signals and then goes into "steady state", which includes the states PHR RX and PDSU RX.)

In label or process 11A of FIG. 9, RX state machine 140 performs an RX initialization state 11A, similarly to the process of RX initialization state 15 in FIG. 2, and then advances to the preamble detection state 17, called SFDD detection, which is similar to the preamble detection state 17 in FIG. 2. However, three preamble detection processes are running simultaneously in state machine 140. When one of the three modulations, for example MOD1, is detected in accordance with preamble detection state 17, then multiple modulation RX state machine 140 advances to the state corresponding to the detected modulation, in this case, TOP_STDY_MOD1 state 123 as indicated by MOD2 SFD PREAMBLE DETECTED arrow 121, and then multiple modulation RX state machine functions in a "steady state" mode in the sense that the TOP_STDY_MOD1 state is the only state being processed. If the processing of physical layer payload PSDU RX in the information package being processed is successfully completed as indicated by arrow 119, then multiple modulation RX state machine 140 returns to preamble detection state 17 and further processing continues in the same manner as in single modulation RX state machine 11 of FIG. 2. However, if an error occurs as indicated by arrow 124 in FIG. 9, then multiple modulation RX state machine 140 advances to error handling state 125, and then advances as indicated by arrow 126 to the TOP_IDIL state 12 in FIG. 9.

It should be understood that if all of the blocks in FIG. 4 were to be "stacked vertically", which would be the case if all of the code in the flash memory were initially copied into RAM as in the prior art, the stack would be very tall, representing a very large amount of costly physical RAM. In contrast, FIG. 4 shows how sharing or "overlapping" of RAM during different states of the state machines provides the substantial advantage of allowing a much smaller amount of costly RAM, indicated by the total height of the diagram in FIG. 4, to be provided. Thus, the described embodiment of the invention of FIGS. 2-6 thereby greatly reduces the cost of RAM in the software-defined TDD communications system. The horizontal axis illustrates how the different categories never appear in the same RAM space at the same time.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

Figure 10:
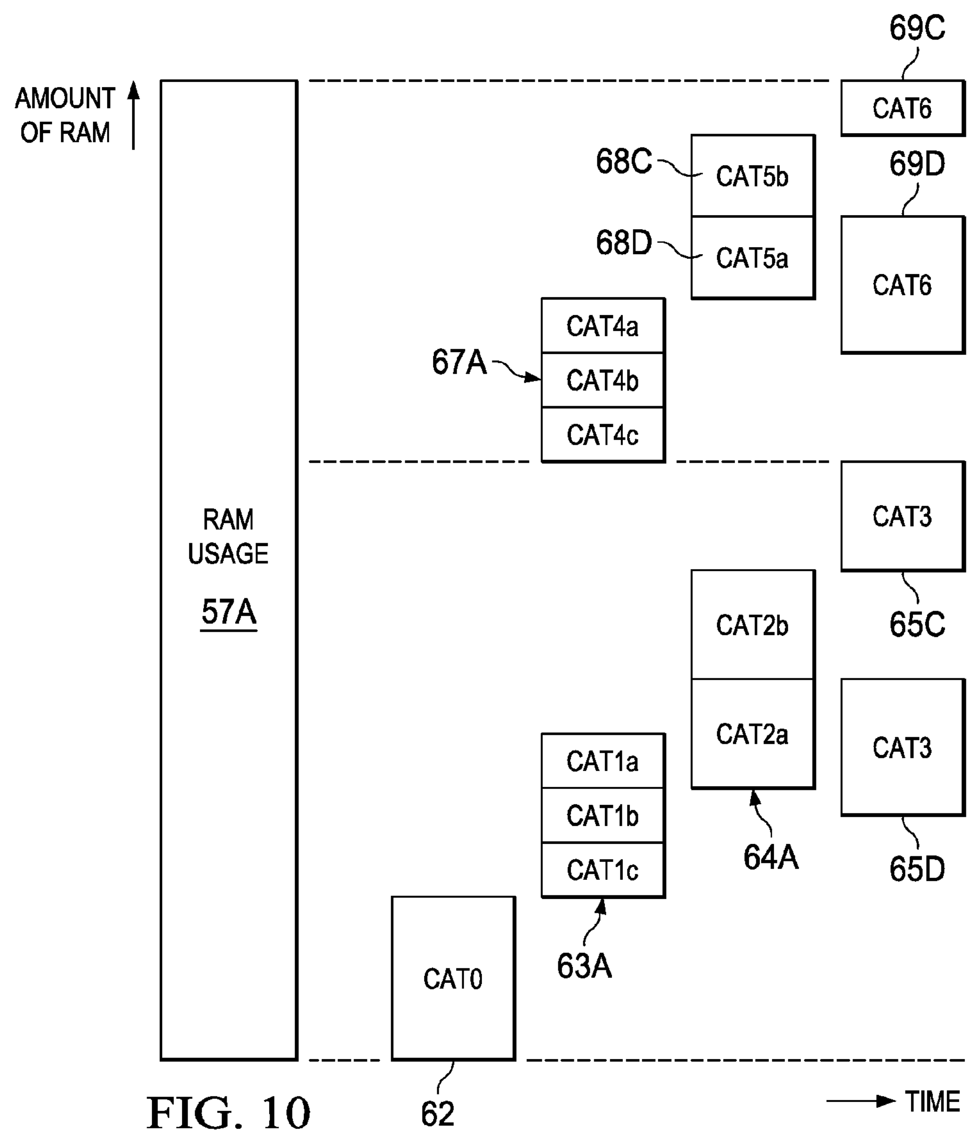
FIG. 10 is a diagram for illustrating an alternative embodiment of the invention in which dynamic RAM sharing is utilized in a FDD (frequency division duplex) system.

For example, the basic idea of the invention is also applicable to a frequency division duplex (FDD) implementation. The diagram of FIG. 10 illustrates features of an alternative embodiment of the invention in which dynamic RAM sharing is utilized in a FDD system. The main difference between TDD and FDD operation is that TX transmission and RX receiving always occurs at different times in a TDD communication system, whereas in a FDD communication system TX transmission and RX receiving may occur simultaneously and therefore the RAM usage of the simultaneous TX transmission and RX reception in a FDD system cannot be dynamically shared. However, in a FDD communication system, dynamic RAM sharing can be utilized among different states within the individual TX state machine 13 and within the individual RX state machine 11 (FIG. 2) using essentially the same method previously described for TDD operation.

FIG. 10 is very similar to FIG. 4, and illustrates dynamic RAM sharing in a FDD system which includes the TX state machine 13 and the RX state machine 11 shown in FIG. 2 and RAM sharing manager 70 in FIG. 5 and which operates in accordance with a Table (not shown) similar to Table 1 and also in accordance with a decision tree similar to the decision tree flowchart 80 of FIG. 6. As in FIG. 4, the vertical dimension of the diagram of FIG. 10 indicates how much RAM space is being used by various RAM sharing categories, and the horizontal dimension indicates the time or order in which different sequential states of TX state machine 13 and RX state machine 11 of FIG. 2 are executed. The reference numerals used to designate various categories in FIG. 4 are the same as the reference numerals used in FIG. 10 to designate similar categories, except that in FIG. 10 a "A" is added to each reference numeral. The main difference between the FDD communication system dynamic RAM allocation illustrated in FIG. 10 and the TDD communication system dynamic RAM allocation illustrated in FIG. 4 is that TX state machine 13 and RX state machine 11 may run simultaneously in the FDD communication system, in contrast to the TDD communication system in which TX state machine 13 and RX state machine 13 must never run during the same time interval. The structure and operation of TX state machine 13 and RX state machine 11 are otherwise essentially the same for a FDD communication system and a TDD communication system.

Consequently, in a FDD communication system all of the RAM sharing categories and their relationship to TX state machine 13 and RX state machine 11 are essentially the same as in a TDD communication system, but "TX RAM" (i.e., sections of RAM used during execution of TX state machine 13) and "RX RAM" (i.e., sections of RAM used during execution of RX state machine 11) cannot "overlap" with each other. For example, in a FDD communication system, TX program code copied from flash memory into a "RAM section A" during a time interval "T1" cannot be later dynamically shared in "RAM section A" with any RX program code during any time interval because TX state machine 13 and RX state machine 11 may both be running during that time interval. However some "TX Program Code X1" that is copied from flash memory into a "RAM section B" may later be dynamically shared with other "TX Program Code X2", after TX state machine 13 is finished executing "TX Program Code X1", and similarly, some "RX Program Code "Y1" may be copied from flash memory into a "RAM section B" which may later be dynamically shared with other "RX Program Code Y2", after RX state machine 11 is finished executing "RX Program Code Y1".

What is claimed is:

1. A method of dynamic sharing of random access memory (RAM) in a software-defined communication system, comprising:

(a) storing categories of program code in a flash memory of the software-defined communication system with individual categories of program code being related to individual states of a state machine having states;

(b) copying the program code of a first category from the flash memory into a first portion of the RAM for a first state of the state machine;

(c) executing the program code of the first category for the first state of the state machine; and (d) copying the program code of a second category from the flash memory into a second portion of the RAM, separate from the first portion, for a second state of the state machine while executing the program code of the first category.

2. The method of claim 1 including moving the state machine from one state to another state, and copying the program code of the second category from the flash memory into the second portion of the RAM separate from the first portion.

3. The method of claim 1 in which the state machine has individual transmission states, individual receive states, and an idle state between the transmission states and receive states, and including moving the state machine from one state to another state.

4. The method of claim 1 including storing a third category of program codes and constant value codes, which are used in multiple states or cannot be copied in other states due to processor operating speed limitations, and copying the third category from the flash memory into a third portion of the RAM, separate from the first and second portions, that is not dynamically shared.

5. The method of claim 1 including overwriting executed program code copied from flash memory into the RAM after that executed program code is no longer needed for execution of a state of the state machine.

6. The method of claim 1 in which the software-defined communication system is a time division duplex (TDD) system.

7. The method of claim 1 in which the software-defined communication system is a frequency division duplex (FDD) system.

8. The method of claim 1 including storing constant value code in the flash memory and copying the constant value code from the flash memory into the RAM.

9. The method of claim 1 including operating a RAM sharing manager module that executes an initialization function and the copying of program code from flash memory into the RAM.

10. The method of claim 1 in which the executing includes executing the program code of a category for a state multiple times in succession.

11. The method of claim 1 in which the storing includes dividing program code in a category into multiple blocks of program code, and the copying including copying each block individually from flash memory into the RAM.

12. The method of claim 1 in which the storing includes dividing program code in a category into multiple blocks of program code, and the copying includes copying each block individually from flash memory into the RAM and distributing the multiple blocks of copied code into designated portions of the RAM.

13. A software-defined communication system comprising:

(a) a state machine having individual states with each state executing an individual category of program code and the state machine being in only one state at a time;

(b) a flash memory storing the categories of program code with individual categories of program codes being related to individual states of the state machine; and (c) RAM sharing manager circuitry coupled to the state machine and to the flash memory and copying a first category of program code from the flash memory into a first portion of the RAM for a first state of the state machine and copying a second category of program code from the flash memory into a second portion of the RAM for a second state of the state machine while executing the program code of the first category.

14. The system of claim 13 in which the software-defined communication system is a time division duplex (TDD) system.

15. The system of claim 13 in which the software-defined communication system is a frequency division duplex (FDD) system.

16. The system of claim 13 in which a third category includes program code and constant value codes, which are frequently used in multiple states or cannot be copied in other states due to processor operating speed limitations, and the RAM sharing manager circuitry copies the third category of program code and constant values from the flash memory into a third portion of the RAM separate from the first portion and the second portion.

17. The system of claim 13 in which the state machine includes transmission states and receive states, and the RAM sharing manager circuitry copies the second category of program code from the flash memory into the second portion of the RAM, separate from the first portion.

18. The method of claim 13 in which a category of program code is divided into multiple blocks of program code, and the RAM sharing manager circuitry copies each block individually from flash memory into a separate portion of the RAM.

19. The method of claim 13 in which a category of program code is divided into multiple blocks of program code, and the RAM sharing manager circuitry copies each block individually from flash memory into the RAM and distributes the multiple blocks of copied code into designated portions of the RAM.

20. A process of operating a state machine having states comprising:

(a) copying a first category of program code for a first state from a first memory into a first portion of a random access memory;

(b) executing the first category of program code for the first state;

(c) copying a second category of program code for a second state from the first memory into a second portion of the random access memory, including overwriting the second category of program code on an overlapping portion of the first portion that is no longer needed in executing the first category;

(d) advancing the state machine to a second state; and (e) executing the second category of program code for the second state of the state machine.

* * * * *